W. J. ZELLER & G. A. STEPHENS.
ANTIRATTLE BEARING PROTECTING DEVICE.
APPLICATION FILED APR. 20, 1915.
1,194,921.
Patented Aug. 15, 1916.
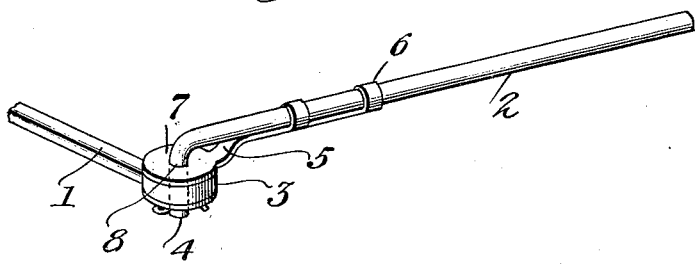
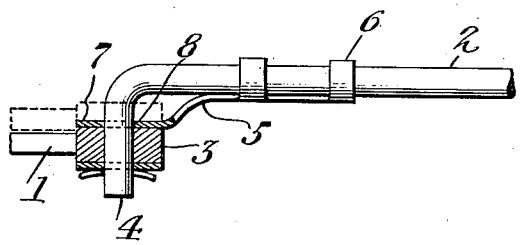
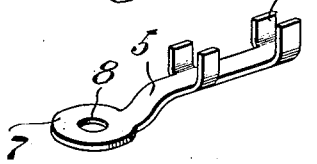
Witnesses
A. V. Doyle.
M. E. Laughlin.
Inventors
W. J. Zeller &
G. A. Stephens
By Victor J. Evans
Attorney

UNITED STATES PATENT OFFICE.

WILLIAM J. ZELLER AND GEORGE A. STEPHENS, OF WINFIELD, NEW YORK.

ANTIRATTLE BEARING-PROTECTING DEVICE.

1,194,921.  Specification of Letters Patent.  Patented Aug. 15, 1916.

Application filed April 20, 1915. Serial No. 22,689.

*To all whom it may concern:*

Be it known that we, WILLIAM J. ZELLER and GEORGE A. STEPHENS, citizens of the United States, residing at Winfield, in the county of Queens and State of New York, have invented new and useful Improvements in Antirattle Bearing-Protecting Devices, of which the following is a specification.

This invention relates to anti-rattle bearing protecting devices adapted to be used on all small rods at all pivotally connecting joints on automobile engines, motor-cycle engines and all other machines where small rods are used with a joint connection.

It is the object of the present invention to provide an anti-rattler and bearing protector of simple and durable structure adapted to be applied to the said parts at their point of connection for the purpose of preventing rattling incident to vibration and also to eliminate wear and displacement of the parts at their point of connection.

With this object in view the device comprises a resilient member having a washer-shaped head adapted to receive the connecting pivot between the parts, the said member being provided with lugs adapted to be bent around one or the other of the rods for holding the same in position. The said washer-shaped head bears resiliently against the side of that member other than the one to which the shank of the said resilient member is attached and consequently produces a relatively stiff joint which eliminates rattling and wear and the objections due to the same.

In the accompanying drawing: Figure 1 is a perspective view of the device applied. Fig. 2 is an edge elevation of the same showing parts in section. Fig. 3 is a perspective view of the resilient member.

As shown in Figs. 1 and 2 of the drawing the rod 1 represents a rod forming a part of the engine or machine (not shown). The rod 2 is another operating part of the engine or machine (not shown). The rod 1 is provided with a flat head 3 in which is pivoted the laterally disposed stud 4 of the rod 2. The anti-rattler and bearing protector comprises a resilient member 5 preferably formed from spring sheet metal the said member having legs 6 which are wrapped around the rod 2 as shown in Figs. 1 and 2 of the drawing. Thus the member 5 is held in position upon the rod 2. The member 5 is provided with an enlarged head 7 which bears against the side of the head 3 and which is spaced from the side of the intermediate portion of the rod 2. The head 7 is provided with an aperture 8 which receives the stud 4 of the rod 2. The head 7 is off set with relation to the end portion of the member 5 at which the legs 6 are located and inasmuch as the member 5 is of spring metal the head 7 bearing against the side of the head 8 will impart sufficient stiffness to the pivot of joint connection between the rods 1 and 2 to prevent the same from rattling when subjected to vibration and also prevent rapid and undue wear of the parts at their points of pivotal connection.

From the above description taken in conjunction with the accompanying drawing it will be seen that an anti-rattle and bearing protecting device of simple and durable structure is provided and that the said device may be easily and quickly applied to movable rods at the joint of pivotal connection for preventing rattling and wear.

Having described the invention what is claimed is:—

In a device of the character described, the combination with a rod having a lateral stud, a stop carried by the stud at a point spaced from the body of the rod, a coupler member loosely mounted on the stud and a resilient member clamped upon said rod at a distance from said stud and having a portion receiving said stud which bears against said coupler member and resiliently holds the same toward the stop.

In testimony whereof we affix our signatures in presence of two witnesses.

WILLIAM J. ZELLER.
GEORGE A. STEPHENS.

Witnesses:
CHAS. HERSHBERGER,
CHAS. WENTWORTH.